US009432557B2

(12) United States Patent
Wang et al.

(10) Patent No.: US 9,432,557 B2
(45) Date of Patent: Aug. 30, 2016

(54) IMAGING LENS, AND ELECTRONIC APPARATUS INCLUDING THE SAME

(71) Applicant: Genius Electronic Optical Co., Ltd., Taichung (TW)

(72) Inventors: Kai-Lun Wang, Xiamen (CN); Ta-Cheng Fan, Taichung (TW); Jin-Hui Gong, Xiamen (CN)

(73) Assignee: Genius Electronic Optical Co., Ltd., Taichung (TW)

( * ) Notice: Subject to any disclaimer, the term of this patent is extended or adjusted under 35 U.S.C. 154(b) by 64 days.

(21) Appl. No.: 14/279,477

(22) Filed: May 16, 2014

(65) Prior Publication Data

US 2015/0185435 A1 Jul. 2, 2015

(30) Foreign Application Priority Data

Dec. 30, 2013 (CN) .......................... 2013 1 0746698

(51) Int. Cl.
  *G02B 9/58* (2006.01)
  *H04N 5/225* (2006.01)
  *G02B 9/34* (2006.01)
  *G02B 13/00* (2006.01)

(52) U.S. Cl.
  CPC .............. *H04N 5/2252* (2013.01); *G02B 9/34* (2013.01); *G02B 9/58* (2013.01); *G02B 13/004* (2013.01)

(58) Field of Classification Search
  CPC ............ G02B 9/00; G02B 9/34; G02B 9/58; G02B 13/00; G02B 13/001; G02B 13/0015; G02B 13/002; G02B 13/004
  See application file for complete search history.

(56) References Cited

U.S. PATENT DOCUMENTS

| 5,835,287 A * | 11/1998 | Ohtake ................ G02B 15/177 359/781 |
| 8,089,698 B1 | 1/2012 | Tang et al. |
| 8,179,616 B1 * | 5/2012 | Hsu .......................... G02B 9/34 359/715 |
| 8,270,097 B2 | 9/2012 | Yamakawa |
| 8,274,593 B2 | 9/2012 | Chen et al. |
| 8,358,475 B2 | 1/2013 | Tsai et al. |
| 8,379,326 B2 | 2/2013 | Yamakawa |
| 8,405,919 B2 | 3/2013 | Tsai et al. |
| 8,411,377 B2 | 4/2013 | Tsai et al. |
| 2011/0242683 A1 | 10/2011 | Yamakawa |
| 2012/0236421 A1* | 9/2012 | Tsai ..................... G02B 13/004 359/780 |

FOREIGN PATENT DOCUMENTS

| CN | 202929281 U | 5/2013 |
| TW | 201217853 A1 | 5/2012 |
| TW | 201245797 A1 | 11/2012 |
| TW | 201300828 A | 1/2013 |
| TW | 201303352 A | 1/2013 |
| TW | 201307889 A | 2/2013 |
| TW | 201312151 A | 3/2013 |

* cited by examiner

*Primary Examiner* — Thong Nguyen
(74) *Attorney, Agent, or Firm* — Jianq Chyun IP Office

(57) ABSTRACT

An imaging lens includes first to fourth lens elements arranged from an object side to an image side in the given order. Through designs of surfaces of the lens elements and relevant lens parameters, a short system length of the imaging lens may be achieved while maintaining good optical performance.

14 Claims, 28 Drawing Sheets

| system focal length =2.407mm , half field-of-view =42.92°, F-number =2.4, system length =4.551mm ||||||||
|---|---|---|---|---|---|---|---|
| lens element | surface | radius of curvature | thickness | refractive index | Abbe number | material | focal length |
| object | | ∞ | 500 | | | | |
| first lens element 3 | object-side surface 31 | 1.8448 | 0.4456 | 1.640 | 23.529 | plastic | -5.512 |
| | image-side surface 32 | 1.0993 | 0.3337 | | | | |
| aperture stop 2 | | ∞ | 0.0167 | | | | |
| second lens element 4 | object-side surface 41 | 10.9517 | 0.3998 | 1.544 | 56.114 | plastic | 2.289 |
| | image-side surface 42 | -1.3926 | 0.4905 | | | | |
| third lens element 5 | object-side surface 51 | -2.9711 | 0.9815 | 1.544 | 56.114 | plastic | 1.358 |
| | image-side surface 52 | -0.6624 | 0.0500 | | | | |
| fourth lens element 6 | object-side surface 61 | 1.3484 | 0.2416 | 1.640 | 23.529 | plastic | -1.586 |
| | image-side surface 62 | 0.5405 | 0.5000 | | | | |
| optical filter 7 | object-side surface 71 | ∞ | 0.2100 | | | | |
| | image-side surface72 | ∞ | 0.8811 | | | | |
| image plane 9 | | ∞ | | | | | |

FIG.3

| surface | 31 | 32 | 41 | 42 |
|---|---|---|---|---|
| K | -6.813957 | 2.236404 | 0 | -13.91593 |
| a4 | 0.30011617 | 0.57323853 | -0.0018354 | -0.7036801 |
| a6 | -0.1655942 | -3.0592722 | 0.58082878 | 1.4640599 |
| a8 | 0.25387653 | 29.558267 | -5.4256055 | -5.488115 |
| a10 | 0.41498397 | -154.87176 | 27.920203 | 13.165271 |
| a12 | -2.3565247 | 431.7146 | -59.763427 | -13.280035 |
| a14 | 3.3842186 | -453.89614 | 29.390591 | -21.149277 |
| a16 | -1.7442225 | -42.248484 | 61.05107 | 52.324071 |
| surface | 51 | 52 | 61 | 62 |
| K | 8.354892 | -2.576902 | -36.53625 | -5.838912 |
| a4 | 0.273347906 | 0.10207251 | -0.284942 | -0.31163377 |
| a6 | -0.3294917 | -0.4598396 | -0.1851973 | 0.15434748 |
| a8 | 0.4040251 | 0.4103058 | 0.10378075 | -0.060117514 |
| a10 | -0.1518556 | -0.0143174 | 0.05170719 | 1.34144E-02 |
| a12 | 0.0245436 | -0.1069374 | -0.1062005 | -4.95058E-04 |
| a14 | -0.277273 | -0.0152199 | 0.02538108 | -6.54254E-05 |
| a16 | 0.2849818 | 0.03648496 | 0.01696155 | -2.94460E-05 |

FIG.4 system focal length =2.180mm, half field-of-view =45.69°, F-number =2.4, system length =4.125mm

| lens element | surface | radius of curvature | thickness | refractive index | Abbe number | material | focal length |
|---|---|---|---|---|---|---|---|
| object | | ∞ | 500 | | | | |
| first lens element 3 | object-side surface 31 | 1.8694 | 0.5484 | 1.640 | 23.529 | plastic | -45.512 |
| | image-side surface 32 | 1.5554 | 0.1347 | | | | |
| aperture stop 2 | | ∞ | 0.0343 | | | | |
| second lens element 4 | object-side surface 41 | -16.8481 | 0.3567 | 1.544 | 56.114 | plastic | 3.113 |
| | image-side surface 42 | -1.5552 | 0.3160 | | | | |
| third lens element 5 | object-side surface 51 | -2.8030 | 1.1460 | 1.544 | 56.114 | plastic | 1.415 |
| | image-side surface 52 | -0.6932 | 0.0500 | | | | |
| fourth lens element 6 | object-side surface 61 | 1.4305 | 0.2751 | 1.640 | 23.529 | plastic | -2.033 |
| | image-side surface 62 | 0.6324 | 0.3000 | | | | |
| optical filter 7 | object-side surface 71 | ∞ | 0.2100 | | | | |
| | image-side surface 72 | ∞ | 0.7544 | | | | |
| image plane 9 | | ∞ | | | | | |

FIG.7

| surface | 31 | 32 | 41 | 42 |
|---|---|---|---|---|
| K | -10.26151 | 3.523178 | 0 | -19.11188 |
| a4 | 0.29712952 | 0.48209957 | -0.0360941 | -0.7395662 |
| a6 | -0.2068628 | -2.8555154 | 0.71378413 | 1.5981121 |
| a8 | 0.23867292 | 31.253792 | -4.8858579 | -5.4606603 |
| a10 | 0.49340131 | -151.77544 | 26.837501 | 11.873005 |
| a12 | -2.2685082 | 401.0889 | -71.628003 | -16.096087 |
| a14 | 3.4058705 | -354.2146 | 3.3394552 | -24.058367 |
| a16 | -1.9338692 | 32.429931 | 290.48555 | 56.670336 |
| surface | 51 | 52 | 61 | 62 |
| K | 9.02384 | -1.758818 | -24.35431 | -5.125181 |
| a4 | 0.14269395 | 0.10919168 | -0.257893 | -0.31318323 |
| a6 | -0.242874 | -0.4865569 | -0.1627284 | 0.16064348 |
| a8 | 0.48221521 | 0.38218628 | 0.13102821 | -0.06067405 |
| a10 | -0.1996293 | -0.0209071 | 0.06766146 | 1.25080E-02 |
| a12 | -0.0229562 | -0.1003975 | -0.1085162 | -7.88494E-04 |
| a14 | -0.2462439 | -0.0089177 | 0.01729954 | -5.51392E-05 |
| a16 | 0.40562275 | 0.03649844 | 0.00885793 | -2.34103E-06 |

FIG.8

| system focal length =2.256mm, half field-of-view =44.39°, F-number =2.4, system length =4.601mm ||||||||
|---|---|---|---|---|---|---|---|
| lens element | surface | radius of curvature | thickness | refractive index | Abbe number | material | focal length |
| object | | ∞ | 500 | | | | |
| first lens element 3 | object-side surface 31 | 1.7339 | 0.4243 | 1.640 | 23.529 | plastic | -11.213 |
| | image-side surface 32 | 1.2643 | 0.3621 | | | | |
| aperture stop 2 | | ∞ | 0.0092 | | | | |
| second lens element 4 | object-side surface 41 | 6.5654 | 0.3810 | 1.544 | 56.114 | plastic | 2.504 |
| | image-side surface 42 | -1.6909 | 0.2902 | | | | |
| third lens element 5 | object-side surface 51 | -2.9055 | 1.5037 | 1.544 | 56.114 | plastic | 1.285 |
| | image-side surface 52 | -0.6683 | 0.0599 | | | | |
| fourth lens element 6 | object-side surface 61 | 1.8381 | 0.3839 | 1.640 | 23.529 | plastic | -1.438 |
| | image-side surface 62 | 0.5659 | 0.5036 | | | | |
| optical filter 7 | object-side surface 71 | ∞ | 0.2100 | | | | |
| | image-side surface 72 | ∞ | 0.4733 | | | | |
| image plane 9 | | ∞ | | | | | |

FIG.11

| surface | 31 | 32 | 41 | 42 |
|---|---|---|---|---|
| K | -6.199673 | 3.716887 | 0 | -34.4869 |
| a4 | 0.28404628 | 0.38775966 | -0.082735 | -0.9187275 |
| a6 | 0.01294672 | -3.0111182 | 1.2706612 | 2.1827817 |
| a8 | 0.01861034 | 32.466926 | -8.3027591 | -6.0597746 |
| a10 | 0.57790384 | -182.03926 | 26.05148 | 7.5316298 |
| a12 | -2.1753253 | 553.64384 | -18.071871 | -1.2646266 |
| a14 | 3.5889485 | -756.33765 | -8.3184598 | 6.3061193 |
| a16 | -1.9651972 | 288.82727 | -75.731342 | -12.879162 |
| surface | 51 | 52 | 61 | 62 |
| K | 12.04922 | -1.231254 | -50.43698 | -4.470128 |
| a4 | 0.03436771 | 0.37814243 | -0.1466977 | -0.20965873 |
| a6 | -0.3306394 | -0.6096558 | -0.144428 | 0.1134406 |
| a8 | 0.36378216 | 0.36939097 | 0.10260007 | -0.047978734 |
| a10 | 0.07813962 | -0.0036346 | 0.0474575 | 1.22914E-02 |
| a12 | -0.3163817 | -0.0893404 | -0.0808301 | -1.20010E-03 |
| a14 | -0.3193679 | 0.00794198 | 0.02948251 | -1.58897E-04 |
| a16 | 1.8201546 | 0.01330178 | -0.002644 | 3.47605E-05 |

FIG.12

| system focal length =1.878mm, half field-of-view =49.44°, F-number =2.4, system length =4.066mm | | | | | | | |
|---|---|---|---|---|---|---|---|
| lens element | surface | radius of curvature | thickness | refractive index | Abbe number | material | focal length |
| object | | ∞ | 500 | | | | |
| first lens element 3 | object-side surface 31 | 1.5675 | 0.4480 | 1.640 | 23.529 | plastic | -18.197 |
| | image-side surface 32 | 1.2278 | 0.1604 | | | | |
| aperture stop 2 | | ∞ | 0.0088 | | | | |
| second lens element 4 | object-side surface 41 | 7.4898 | 0.3812 | 1.544 | 56.114 | plastic | 2.549 |
| | image-side surface 42 | -1.6781 | 0.2905 | | | | |
| third lens element 5 | object-side surface 51 | -2.5998 | 1.3208 | 1.544 | 56.114 | plastic | 1.385 |
| | image-side surface 52 | -0.6909 | 0.0500 | | | | |
| fourth lens element 6 | object-side surface 61 | 2.4258 | 0.6999 | 1.640 | 23.529 | plastic | -1.420 |
| | image-side surface 62 | 0.5894 | 0.3500 | | | | |
| optical filter 7 | object-side surface 71 | ∞ | 0.2100 | | | | |
| | image-side surface72 | ∞ | 0.1468 | | | | |
| image plane 9 | | | | | | | |

FIG.15

| surface | 31 | 32 | 41 | 42 |
|---|---|---|---|---|
| K | -3.92699 | 3.967687 | 0 | -34.73641 |
| a4 | 0.29125202 | 0.46918529 | 0.00110507 | -0.9233729 |
| a6 | -0.0156876 | -2.87201 33 | 0.57402656 | 2.0852584 |
| a8 | 0.0007069 | 32.253118 | -4.2061844 | -6.9976592 |
| a10 | 0.61171536 | -190.52811 | 46.628714 | 6.5357317 |
| a12 | -2.102742 | 528.62241 | -126.83535 | 2.4646833 |
| a14 | 3.5085745 | -505.60488 | -1256.431 | 12.368972 |
| a16 | -3.1238911 | 23.231946 | 5861.1936 | -89.205129 |
| surface | 51 | 52 | 61 | 62 |
| K | 11.65155 | -1.031059 | -27.95869 | -3.871931 |
| a4 | 0.07815679 | 0.33596026 | -0.1359713 | -0.21289019 |
| a6 | -0.3181914 | -0.6135187 | -0.1435607 | 0.11269776 |
| a8 | 0.36699605 | 0.37207432 | 0.10217404 | -0.047996174 |
| a10 | 0.11045796 | -0.0019516 | 0.04687564 | 1.23097E-02 |
| a12 | -0.1678545 | -0.0888722 | -0.0811311 | -1.19882E-03 |
| a14 | -0.066014 | 0.0078893 | 0.02938316 | -1.61128E-04 |
| a16 | 0.21881039 | 0.01307367 | -0.0026551 | 3.34160E-05 |

FIG.16 system focal length =1.989mm, half field-of-view =47.41°, F-number =2.4, system length =3.930mm

| lens element | surface | radius of curvature | thickness | refractive index | Abbe number | material | focal length |
|---|---|---|---|---|---|---|---|
| object | | ∞ | 500 | | | | |
| first lens element 3 | object-side surface 31 | 1.7644 | 0.3509 | 1.640 | 23.529 | plastic | -86.504 |
| | image-side surface 32 | 1.5769 | 0.2179 | | | | |
| aperture stop 2 | | ∞ | -0.0016 | | | | |
| second lens element 4 | object-side surface 41 | 8.8971 | 0.3592 | 1.544 | 56.114 | plastic | 4.318 |
| | image-side surface 42 | -3.1619 | 0.3183 | | | | |
| third lens element 5 | object-side surface 51 | -3.8160 | 1.1277 | 1.544 | 56.114 | plastic | 1.200 |
| | image-side surface 52 | -0.6176 | 0.0646 | | | | |
| fourth lens element 6 | object-side surface 61 | 1.4095 | 0.3556 | 1.640 | 23.529 | plastic | -1.524 |
| | image-side surface 62 | 0.5216 | 0.5000 | | | | |
| optical filter 7 | object-side surface 71 | ∞ | 0.2100 | | | | |
| | image-side surface72 | ∞ | 0.4275 | | | | |
| image plane 9 | | ∞ | | | | | |

FIG.19

| surface | 31 | 32 | 41 | 42 |
|---|---|---|---|---|
| K | -3.239684 | 5.213496 | 0 | -97.85942 |
| a4 | 0.2609084 | 0.4897145 | 0.08660656 | -0.3643837 |
| a6 | 0.1576997 | -2.0213016 | 0.09396951 | 1.3242772 |
| a8 | -0.0079371 | 26.254697 | -0.8366345 | -7.0582264 |
| a10 | 0.28661989 | -155.9365 | 33.294046 | 18.893224 |
| a12 | -1.4956441 | 544.90805 | -136.49905 | -6.198214 |
| a14 | 4.6099297 | -938.66243 | -395.11165 | -85.172403 |
| a16 | -4.4546339 | 614.66312 | 2261.2372 | 128.23797 |
| surface | 51 | 52 | 61 | 62 |
| K | 19.9555 | -1.237507 | -34.85203 | -4.545348 |
| a4 | 0.132261731 | 0.36155281 | -0.1358713 | -0.21420626 |
| a6 | -0.3904768 | -0.6460764 | -0.1480707 | 0.11712594 |
| a8 | 0.76151626 | 0.371121953 | 0.10998431 | -0.048426799 |
| a10 | 0.1046958 | 0.02477044 | 0.04978192 | 1.23898E-02 |
| a12 | -0.6817774 | -0.068093 | -0.0810513 | -1.23093E-03 |
| a14 | -1.25511585 | 0.00472526 | 0.0290259 | -1.77942E-04 |
| a16 | 2.0234821 | 0.00946395 | -0.0027348 | 4.08151E-05 |

| system focal length =1.850mm, half field-of-view =49.58°, F-number =2.4, system length =3.571mm |||||||
|---|---|---|---|---|---|---|
| lens element | surface | radius of curvature | thickness | refractive index | Abbe number | material | focal length |
| object | | ∞ | 500 | | | | |
| first lens element 3 | object-side surface 31 | 1.7477 | 0.4154 | 1.640 | 23.529 | plastic | -48.143 |
| | image-side surface 32 | 1.5004 | 0.2023 | | | | |
| aperture stop 2 | | ∞ | -0.0081 | | | | |
| second lens element 4 | object-side surface 41 | 5.6674 | 0.4452 | 1.544 | 56.114 | plastic | 3.654 |
| | image-side surface 42 | -2.9931 | 0.3426 | | | | |
| third lens element 5 | object-side surface 51 | -3.7844 | 0.7601 | 1.544 | 56.114 | plastic | 1.240 |
| | image-side surface 52 | -0.6148 | 0.0837 | | | | |
| fourth lens element 6 | object-side surface 61 | 1.3857 | 0.3424 | 1.640 | 23.529 | plastic | -1.553 |
| | image-side surface 62 | 0.5250 | 0.5000 | | | | |
| optical filter 7 | object-side surface 71 | ∞ | 0.2100 | | | | |
| | image-side surface 72 | ∞ | 0.2773 | | | | |
| image plane 9 | | ∞ | | | | | |

| surface | 31 | 32 | 41 | 42 |
|---|---|---|---|---|
| K | -4.933206 | 4.897524 | 0 | -80.87387 |
| a4 | 0.23699965 | 0.47005027 | 0.08748181 | -0.4004169 |
| a6 | 0.124405035 | -2.2044183 | 0.35819669 | 1.2282582 |
| a8 | -0.0539004 | 26.131061 | -0.682815 | -7.1287292 |
| a10 | 0.22662323 | -152.83067 | 27.572803 | 19.139035 |
| a12 | -1.561472 | 561.17125 | -177.6447 | -4.4226343 |
| a14 | 4.6133358 | -925.22148 | -460.43076 | -81.506248 |
| a16 | -4.0778808 | 246.15195 | 4447.4464 | 110.04528 |
| surface | 51 | 52 | 61 | 62 |
| K | 19.81344 | -1.223191 | -34.34593 | -4.417254 |
| a4 | 0.12314868 | 0.35758692 | -0.1347268 | -0.21139308 |
| a6 | -0.4202594 | -0.6463319 | -0.1469874 | 0.11762409 |
| a8 | 0.717705705 | 0.37329326 | 0.11043656 | -0.048306338 |
| a10 | 0.06114618 | 0.02728764 | 0.05001383 | 1.24124E-02 |
| a12 | -0.6994875 | -0.0666981 | -0.0808973 | -1.22807E-03 |
| a14 | -1.2288309 | 0.00432506 | 0.02912187 | -1.78083E-04 |
| a16 | 2.0387218 | 0.00683285 | -0.0026616 | 4.04800E-05 |

FIG.24

| relationship | first preferred embodiment | second preferred embodiment | third preferred embodiment | fourth preferred embodiment | fifth preferred embodiment | sixth preferred embodiment |
|---|---|---|---|---|---|---|
| ALT | 2.069 | 2.326 | 2.693 | 2.850 | 2.193 | 1.963 |
| Gaa | 0.891 | 0.535 | 0.721 | 0.510 | 0.599 | 0.620 |
| BFL | 1.591 | 1.264 | 1.187 | 0.707 | 1.138 | 0.987 |
| T3/G12 | 2.801 | 6.783 | 4.050 | 7.806 | 5.214 | 3.915 |
| ALT/BFL | 1.300 | 1.840 | 2.269 | 4.032 | 1.928 | 1.988 |
| T4/G12 | 0.690 | 1.629 | 1.034 | 4.136 | 1.644 | 1.764 |
| T3/G23 | 2.001 | 3.626 | 5.182 | 4.546 | 3.543 | 2.218 |
| ALT/G12 | 5.903 | 13.769 | 7.252 | 16.843 | 10.141 | 10.112 |
| BFL/T1 | 3.571 | 2.306 | 2.798 | 1.578 | 3.242 | 2.377 |
| BFL/Gaa | 1.786 | 2.364 | 1.645 | 1.387 | 1.899 | 1.591 |
| T3/T1 | 2.203 | 2.090 | 3.544 | 2.949 | 3.214 | 1.830 |
| BFL/G23 | 3.244 | 4.001 | 4.090 | 2.433 | 3.574 | 2.882 |
| T3/T2 | 2.455 | 3.213 | 3.947 | 3.465 | 3.139 | 1.707 |
| T3/Gaa | 1.102 | 2.142 | 2.084 | 2.591 | 1.882 | 1.225 |
| BFL/G12 | 4.540 | 7.485 | 3.197 | 4.177 | 5.260 | 5.085 |
| ALT/Gaa | 2.322 | 4.348 | 3.733 | 5.591 | 3.661 | 3.164 |

FIG.26

IMAGING LENS, AND ELECTRONIC APPARATUS INCLUDING THE SAME

CROSS-REFERENCE TO RELATED APPLICATION

This application claims priority to Chinese Application No. 201310746698.7, filed on Dec. 30, 2013.

BACKGROUND OF THE INVENTION

1. Field of the Invention

The present invention relates to an imaging lens and an electronic apparatus including the same.

2. Description of the Related Art

In recent years, as use of portable electronic devices (e.g., mobile phones and digital cameras) becomes ubiquitous, much effort has been put into reducing dimensions of portable electronic devices. Moreover, as dimensions of charged coupled device (CCD) and complementary metal-oxide semiconductor (CMOS) based optical sensors are reduced, dimensions of imaging lenses for use with the optical sensors must be correspondingly reduced without significantly compromising optical performance.

Each of U.S. patent application publication no. 2011/0242683, and U.S. Pat. Nos. 8,270,097 and 8,379,326 discloses a conventional imaging lens that includes four lens elements, first and second lens elements of which has negative refractive power. However, an air gap between the first and second lens elements is relatively large, resulting in a long system length, and disfavoring miniaturization.

Reducing the system length of the imaging lens while maintaining satisfactory optical performance is always a goal in the industry.

SUMMARY OF THE INVENTION

Therefore, an object of the present invention is to provide an imaging lens having a shorter overall length while maintaining good optical performance.

According to one aspect of the present invention, an imaging lens comprises a first lens element, an aperture stop, a second lens element, a third lens element and a fourth lens element arranged in order from an object side to an image side along an optical axis of the imaging lens. Each of the first lens element, the second lens element, the third lens element and the fourth lens element has an object-side surface facing toward the object side, and an image-side surface facing toward the image side.

The object-side surface of the first lens element has a convex portion in a vicinity of the optical axis. The second lens element has a positive refractive power. The third lens element has a positive refractive power. The image-side surface of the fourth lens element has a concave portion in a vicinity of the optical axis, and a convex portion in a vicinity of a periphery of the fourth lens element.

The imaging lens satisfies $T3/G12 \geq 2.8$, where $T3$ represents a thickness of the third lens element at the optical axis, and $G12$ represents an air gap length between the first lens element and the second lens element at the optical axis.

The imaging lens does not include any lens element with refractive power other than the first lens element, the second lens element, the third lens element and the fourth lens element.

According to another aspect of the present invention, an imaging lens comprises a first lens element, an aperture stop, a second lens element, a third lens element and a fourth lens element arranged in order from an object side to an image side along an optical axis of the imaging lens. Each of the first lens element, the second lens element, the third lens element and the fourth lens element has an object-side surface facing toward the object side, and an image-side surface facing toward the image side.

The object-side surface of the first lens element has a convex portion in a vicinity of the optical axis. The second lens element has a positive refractive power. The third lens element has a positive refractive power. The fourth lens element has a negative refractive power. The image-side surface of the fourth lens element has a concave portion in a vicinity of the optical axis, and a convex portion in a vicinity of a periphery of the fourth lens element. The imaging lens does not include any lens element with refractive power other than the first lens element, the second lens element, the third lens element and the fourth lens element.

Another object of the present invention is to provide an electronic apparatus having an imaging lens with four lens elements.

According to another aspect of the present invention, an electronic apparatus includes a housing and an imaging module. The imaging module is disposed in the housing, and includes the imaging lens of the present invention, a barrel on which the imaging lens is disposed, a holder unit on which the barrel is disposed, and an image sensor disposed at the image side of the imaging lens.

BRIEF DESCRIPTION OF THE DRAWINGS

Other features and advantages of the present invention will become apparent in the following detailed description of the preferred embodiments with reference to the accompanying drawings, of which:

FIG. 3 shows values of some optical data corresponding to the imaging lens of the first preferred embodiment;

FIG. 4 shows values of some aspherical coefficients corresponding to the imaging lens of the first preferred embodiment;

FIG. 7 shows values of some optical data corresponding to the imaging lens of the second preferred embodiment;

FIG. 8 shows values of some aspherical coefficients corresponding to the imaging lens of the second preferred embodiment;

FIG. 11 shows values of some optical data corresponding to the imaging lens of the third preferred embodiment;

FIG. 12 shows values of some aspherical coefficients corresponding to the imaging lens of the third preferred embodiment;

FIG. 15 shows values of some optical data corresponding to the imaging lens of the fourth preferred embodiment;

FIG. 16 shows values of some aspherical coefficients corresponding to the imaging lens of the fourth preferred embodiment;

FIG. 19 shows values of some optical data corresponding to the imaging lens of the fifth preferred embodiment;

FIG. 20 shows values of some aspherical coefficients corresponding to the imaging lens of the fifth preferred embodiment;

FIG. 23 shows values of some optical data corresponding to the imaging lens of the sixth preferred embodiment;

FIG. 24 shows values of some aspherical coefficients corresponding to the imaging lens of the sixth preferred embodiment;

FIG. 26 is a table that lists values of relationships among some lens parameters corresponding to the imaging lenses of the first to sixth preferred embodiments;

DETAILED DESCRIPTION OF THE PREFERRED EMBODIMENTS

Figure 1:
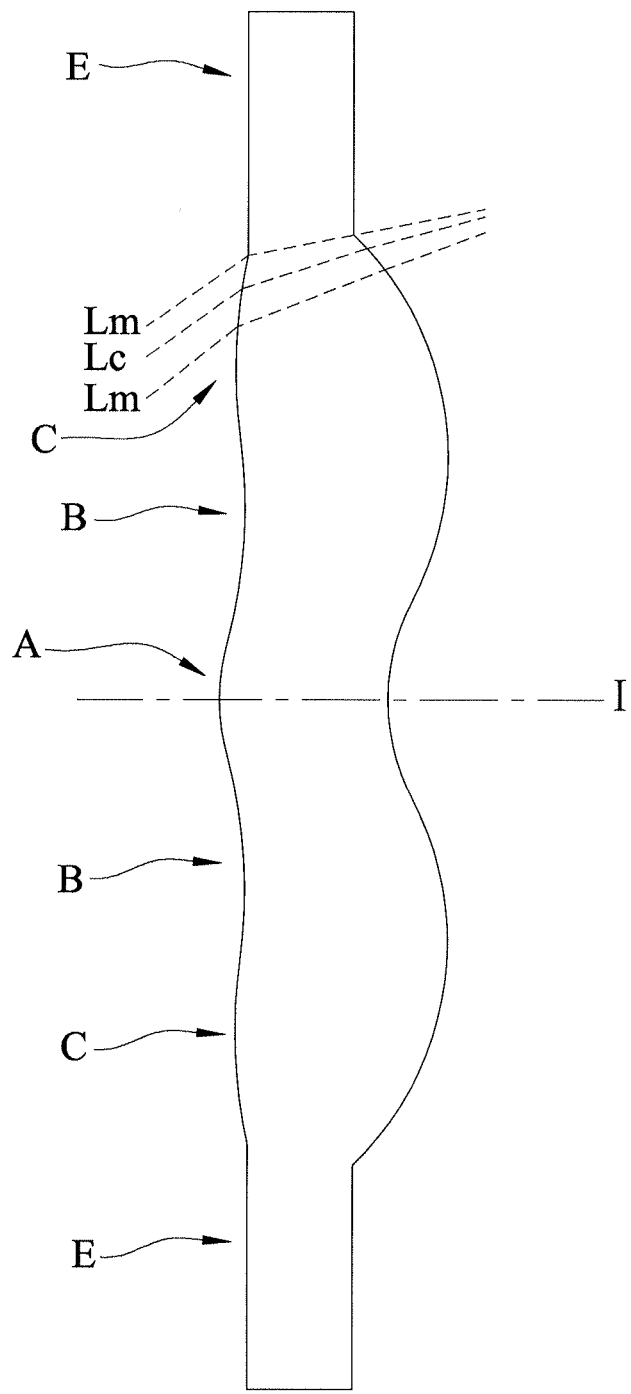
FIG. 1 is a schematic diagram to illustrate the structure of a lens element.

Before the present invention is described in greater detail, it should be noted that like elements are denoted by the same reference numerals throughout the disclosure.

In the following description, "a lens element has a positive (or negative) refractive power" means the lens element has a positive (or negative) refractive power in a vicinity of an optical axis thereof. "An object-side surface (or image-side surface) has a convex (or concave) portion at a certain area" means that, compared to a radially exterior area adjacent to said certain area, said certain area is more convex (or concave) in a direction parallel to the optical axis. Referring to FIG. 1 as an example, the lens element is radially symmetrical with respect to an optical axis (I) thereof. The object-side surface of the lens element has a convex portion at an area A, a concave portion at an area B, and a convex portion at an area C. This is because the area A is more convex in a direction parallel to the optical axis (I) in comparison with a radially exterior area thereof (i.e., area B), the area B is more concave in comparison with the area C, and the area C is more convex in comparison with an area E. "In a vicinity of a periphery" refers to an area around a periphery of a curved surface of the lens element for passage of imaging light only, which is the area C in FIG. 1. The imaging light includes a chief ray Lc and a marginal ray Lm. "In a vicinity of the optical axis" refers to an area around the optical axis of the curved surface for passage of the imaging light only, which is the area A in FIG. 1. In addition, the lens element further includes an extending portion E for installation into an optical imaging lens device. Ideally, the imaging light does not pass through the extending portion E. The structure and shape of the extending portion E are not limited herein. In the following embodiments, the extending portion E is not depicted in the drawings for the sake of clarity.

Figure 2:
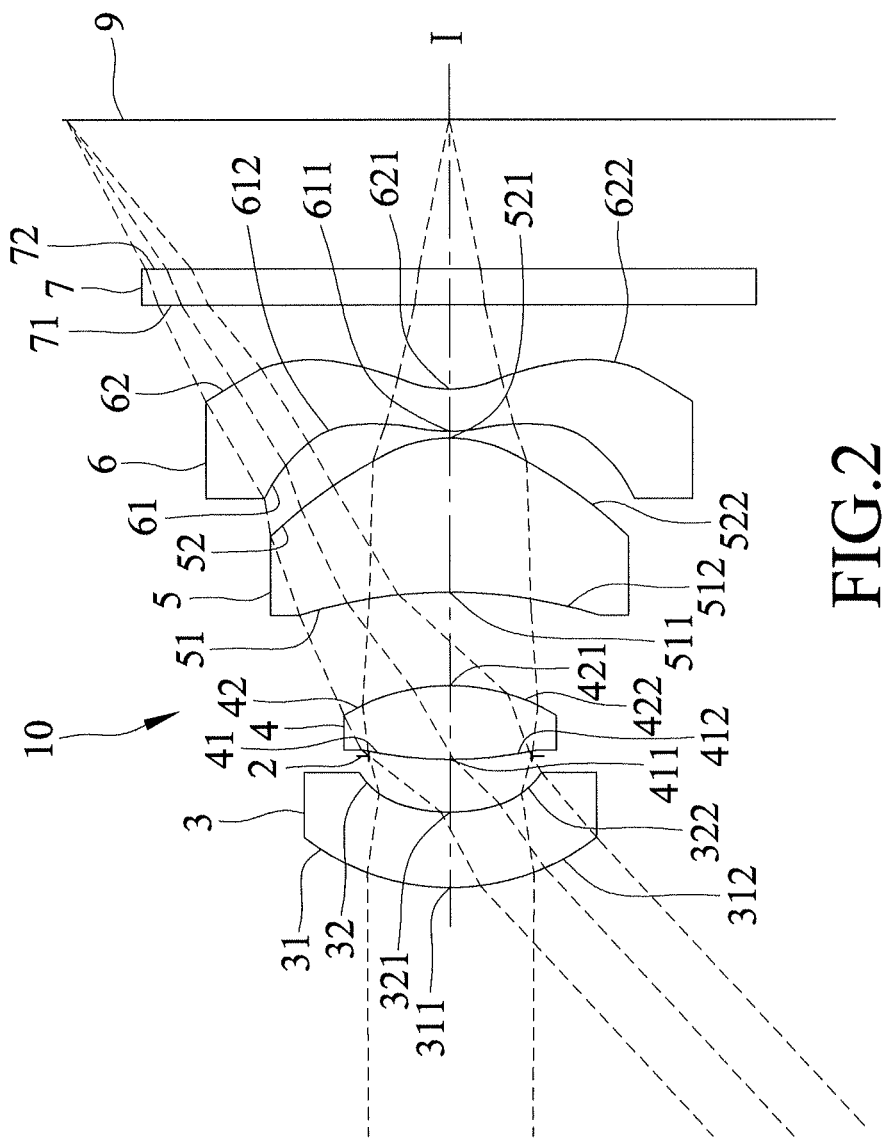
FIG. 2 is a schematic diagram that illustrates the first preferred embodiment of an imaging lens according to the present invention.

Referring to FIG. 2, the first preferred embodiment of an imaging lens 10 according to the present invention includes a first lens element 3, an aperture stop 2, a second lens element 4, a third lens element 5, a fourth lens element 6 and an optical filter 7 arranged in the given order along an optical axis (I) from an object side to an image side. The optical filter 7 is an infrared cut filter for selectively absorbing infrared light to thereby reduce imperfection of images formed at an image plane 9. In other embodiments, the optical filter 7 may be a filter that filters out visible light, and that allows passage of infrared light for use in an infrared sensor.

Each of the first, second, third, and fourth lens elements 3-6 and the optical filter 7 has an object-side surface 31, 41, 51, 61, 71 facing toward the object side, and an image-side surface 32, 42, 52, 62, 72 facing toward the image side. Light entering the imaging lens 10 travels through the object-side and image-side surfaces 31, 32 of the first lens element 3, the aperture stop 2, the object-side and image-side surfaces 41, 42 of the second lens element 4, the object-side and image-side surfaces 51, 52 of the third lens element 5, the object-side and image-side surfaces 61, 62 of the fourth lens element 6, and the object-side and image-side surfaces 71, 72 of the optical filter 7, in the given order, to form an image on the image plane 9. In this embodiment, each of the object-side surfaces 31, 41, 51, 61 and the image-side surfaces 32, 42, 52, 62 is aspherical and has a center point coinciding with the optical axis (I).

Each of the lens elements 3-6 is made of a plastic material and has a refractive power in this embodiment. However, at least one of the lens elements 3-6 may be made of other materials in other embodiments.

In the first preferred embodiment, which is depicted in FIG. 2, the first lens element 3 has a negative refractive power. The object-side surface 31 of the first lens element 3 is a convex surface that has a convex portion 311 in a vicinity of the optical axis (I), and a convex portion 312 in a vicinity of a periphery of the first lens element 3. The image-side surface 32 of the first lens element 3 is a concave surface that has a concave portion 321 in a vicinity of the optical axis (I), and a concave portion 322 in a vicinity of the periphery of the first lens element 3.

The second lens element 4 has a positive refractive power. The object-side surface 41 of the second lens element 4 is a convex surface that has a convex portion 411 in a vicinity of the optical axis (I), and a convex portion 412 in a vicinity of a periphery of the second lens element 4. The image-side surface 42 of the second lens element 4 is a convex surface that has a convex portion 421 in a vicinity of the optical axis (I), and a convex portion 422 in a vicinity of the periphery of the second lens element 4.

The third lens element 5 has a positive refractive power. The object-side surface 51 of the third lens element 5 is a concave surface that has a concave portion 511 in a vicinity of the optical axis (I), and a concave portion 512 in a vicinity of a periphery of the third lens element 5. The image-side surface 52 of the third lens element 5 is a convex surface that has a convex portion 521 in a vicinity of the optical axis (I), and a convex portion 522 in a vicinity of the periphery of the third lens element 5.

The fourth lens element 6 has a negative refractive power. The object-side surface 61 of the fourth lens element 6 has a convex portion 611 in a vicinity of the optical axis (I), and a concave portion 612 in a vicinity of a periphery of the fourth lens element 6. The image-side surface 62 of the fourth lens element 6 has a concave portion 621 in a vicinity of the optical axis (I), and a convex portion 622 in a vicinity of the periphery of the fourth lens element 6.

In the first preferred embodiment, the imaging lens 10 does not include any lens element with refractive power other than the aforesaid lens elements 3-6.

Shown in FIG. 3 is a table that lists values of some optical data corresponding to the surfaces 31-71, 32-72 of the first preferred embodiment. The imaging lens 10 has an overall system effective focal length (EFL) of 2.407 mm, a half field-of-view (HFOV) of 42.92°, an F-number of 2.4, and a system length of 4.551 mm. The system length refers to a distance between the object-side surface 31 of the first lens element 3 and the image plane 9 at the optical axis (I).

In this embodiment, each of the object-side surfaces 31-61 and the image-side surfaces 32-62 is aspherical, and satisfies the relationship of $$Z(Y) = \frac{Y^2}{R} \Big/ \left(1 + \sqrt{1-(1+K)\frac{Y^2}{R^2}}\right) + \sum_{i=1}^{n} a_i \times Y^i \quad (1)$$

where:

R represents a radius of curvature of an aspherical surface;

Z represents a depth of the aspherical surface, which is defined as a perpendicular distance between an arbitrary point on the aspherical surface that is spaced apart from the optical axis (I) by a distance Y, and a tangent plane at a vertex of the aspherical surface at the optical axis (I);

γ represents a perpendicular distance between the arbitrary point on the aspherical surface and the optical axis (I);

K represents a conic constant; and $a_i$ represents an $i^{th}$ aspherical coefficient.

Shown in FIG. 4 is a table that lists values of some aspherical coefficients of the aforementioned relationship (1) corresponding to the first preferred embodiment.

Relationships among some of the aforementioned lens parameters corresponding to the first preferred embodiment are as follows:

ALT=2.069; Gaa=0.891; BFL=1.591;
T3/G12=2.801; ALT/BFL=1.300;
T4/G12=0.690; T3/G23=2.001;
ALT/G12=5.903; BFL/T1=3.571;
BFL/Gaa=1.786; T3/T1=2.203;
BFL/G23=3.244; T3/T2=2.455;
T3/Gaa=1.102; BFL/G12=4.540; and
ALT/Gaa=2.322
where:

T1 represents a thickness of the first lens element 3 at the optical axis (I);

T2 represents a thickness of the second lens element 4 at the optical axis (I);

T3 represents a thickness of the third lens element 5 at the optical axis (I);

T4 represents a thickness of the fourth lens element 6 at the optical axis (I);

G12 represents an air gap length between the first lens element 3 and the second lens element 4 at the optical axis (I);

G23 represents an air gap length between the second lens element 4 and the third lens element 5 at the optical axis (I);

Gaa represents a sum of air gap widths among the first lens element 3, the second lens element 4, the third lens element 5, and the fourth lens element 6 at the optical axis (I);

ALT represents a sum of thicknesses of the first lens element 3, the second lens element 4, the third lens element 5 and the fourth lens element 6 at the optical axis (I); and BFL represents a back focal length of the imaging lens 10, i.e., a distance at the optical axis (I) between the image-side surface 62 of the fourth lens element 6 and the image plane 9.

FIGS. 5(a) to 5(d) respectively show simulation results corresponding to longitudinal spherical aberration, sagittal astigmatism aberration, tangential astigmatism aberration, and distortion aberration of the first preferred embodiment. In each of the simulation results, curves corresponding respectively to wavelengths of 470 nm, 555 nm, and 650 nm are shown.

Figure 5:
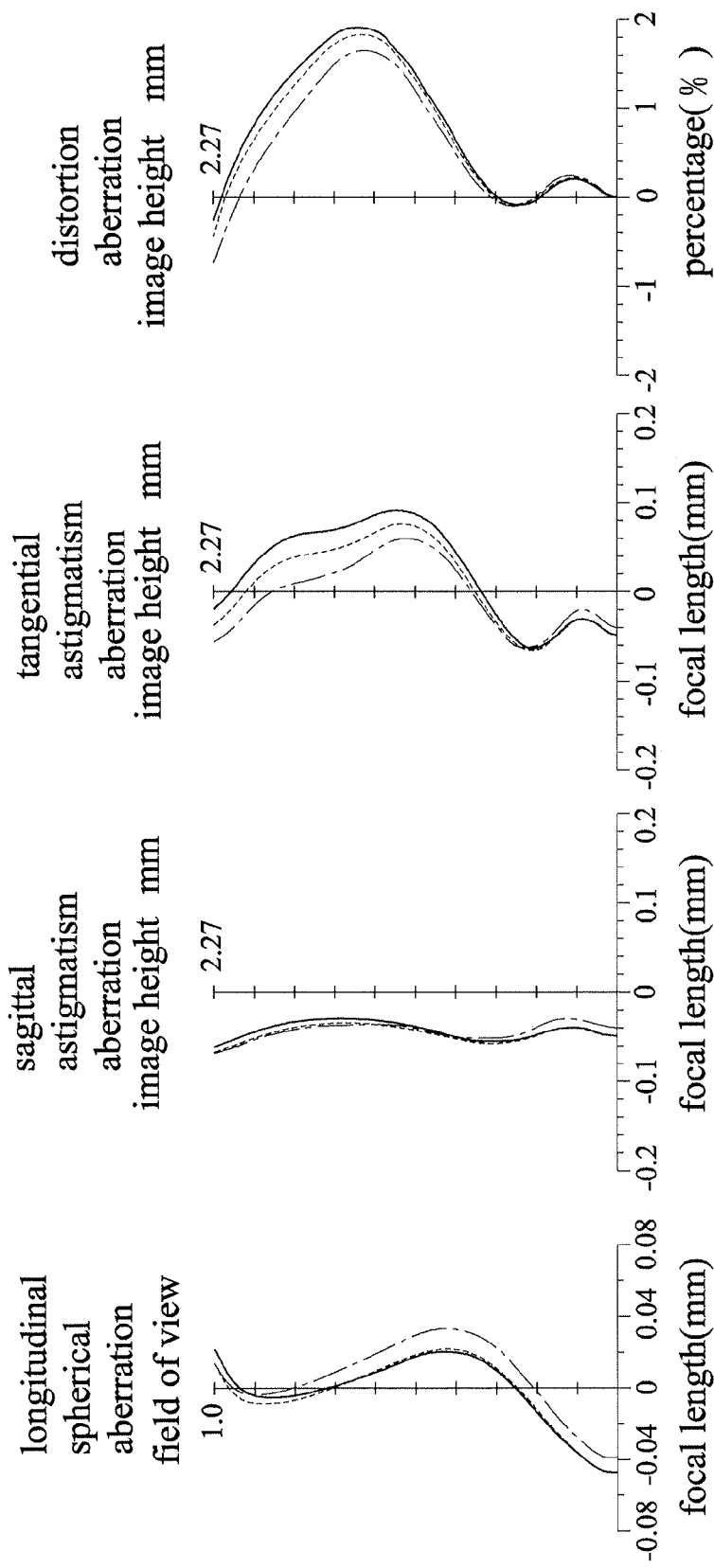
FIGS. 5(a) to 5(d) show different optical characteristics of the imaging lens of the first preferred embodiment.

It can be understood from FIG. 5(a) that, since each of the curves corresponding to longitudinal spherical aberration has a focal length at each field of view (indicated by the vertical axis) that falls within the range of ±0.05 mm, the first preferred embodiment is able to achieve a relatively low spherical aberration at each of the wavelengths. Furthermore, since the curves of each wave length are close to each other, the first preferred embodiment has a relatively low chromatic aberration.

It can be understood from FIGS. 5(b) and 5(c) that, since each of the curves falls within the range of ±0.1 mm of focal length, the first preferred embodiment has a relatively low optical aberration.

Moreover, as shown in FIG. 5(d), since each of the curves corresponding to distortion aberration falls within the range of ±2%, the first preferred embodiment is able to meet requirements in imaging quality of most optical systems.

In view of the above, even with the system length reduced down to 4.55 mm, the imaging lens 10 of the first preferred embodiment is still able to achieve a relatively good optical performance.

Figure 6:
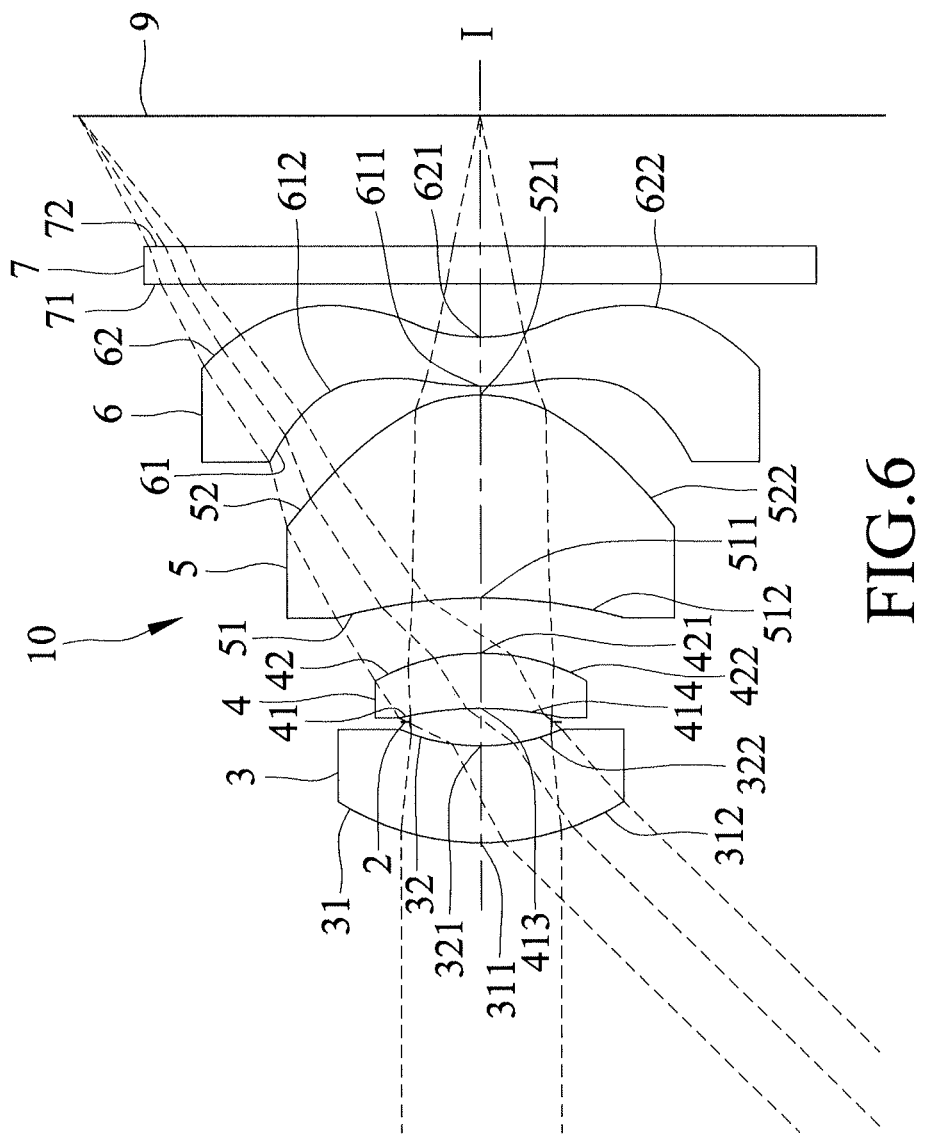
FIG. 6 is a schematic diagram that illustrates the second preferred embodiment of an imaging lens according to the present invention.
Figure 9:
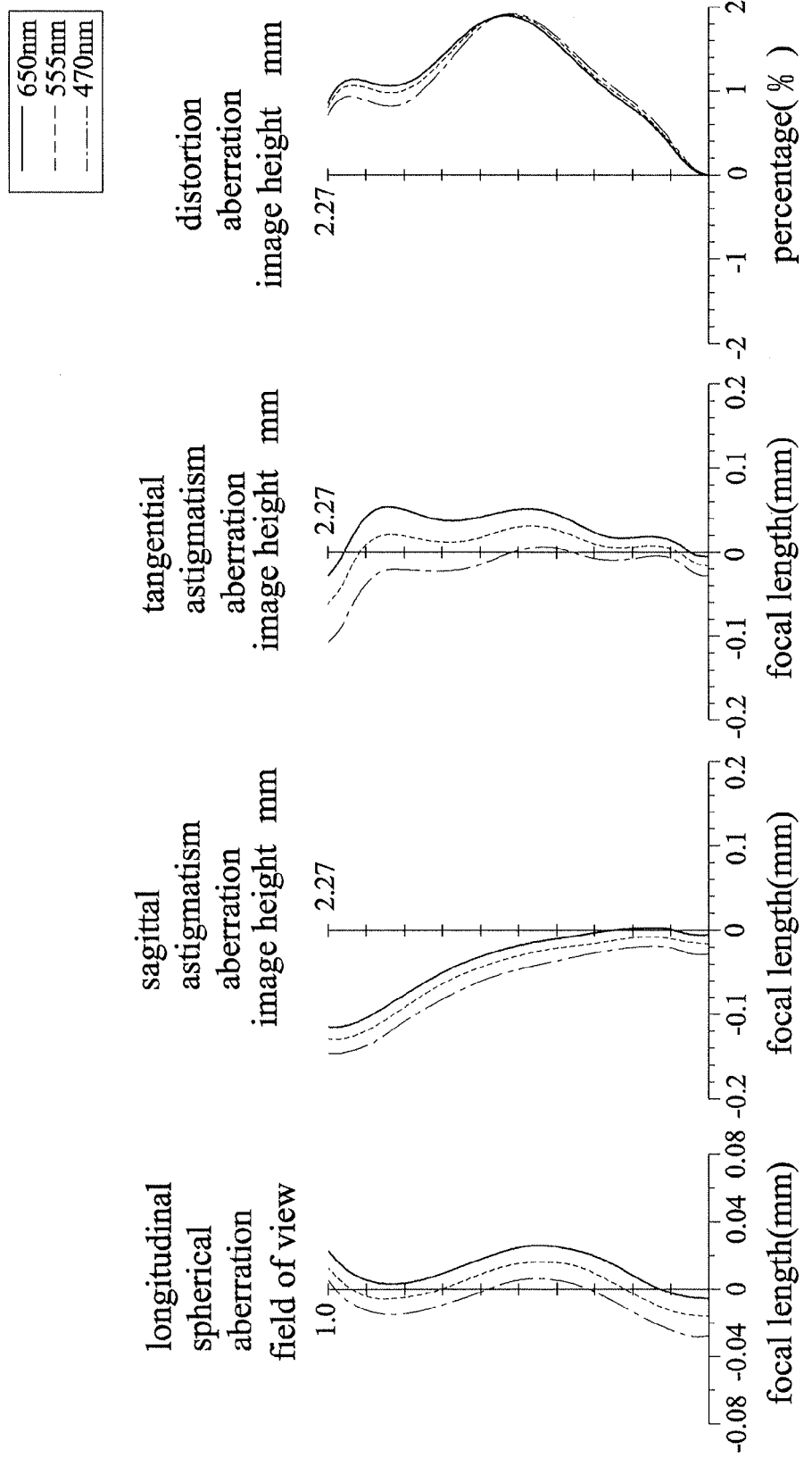
FIGS. 9(a) to 9(d) show different optical characteristics of the imaging lens of the second preferred embodiment.

Referring to FIG. 6, the differences between the first and second preferred embodiments of the imaging lens 10 of this invention reside in that: the object-side surface 41 of the second lens element 4 has a concave portion 413 in a vicinity of the optical axis (I), and a concave portion 414 in a vicinity of a periphery of the second lens element 4.

Shown in FIG. 7 is a table that lists values of some optical data corresponding to the surfaces 31-71, 32-72 of the second preferred embodiment. The imaging lens 10 has an overall system focal length of 2.180 mm, an HFOV of 45.69°, an F-number of 2.4, and a system length of 4.125 mm.

Shown in FIG. 8 is a table that lists values of some aspherical coefficients of the aforementioned relationship (1) corresponding to the second preferred embodiment.

Relationships among some of the aforementioned lens parameters corresponding to the second preferred embodiment are as follows:

ALT=2.326; Gaa=0.535; BFL=1.264;
T3/G12=6.783; ALT/BFL=1.840;
T4/G12=1.629; T3/G23=3.626;
ALT/G12=13.769; BFL/T1=2.306;
BFL/Gaa=2.364; T3/T1=2.090;

BFL/G23=4.001; T3/T2=3.213;
T3/Gaa=2.142; BFL/G12=7.485; and
ALT/Gaa=4.348.

FIGS. 9(a) to 9(d) respectively show simulation results corresponding to longitudinal spherical aberration, sagittal astigmatism aberration, tangential astigmatism aberration, and distortion aberration of the second preferred embodiment. It can be understood from FIGS. 9(a) to 9(d) that the second preferred embodiment is able to achieve a relatively good optical performance.

Figure 10:
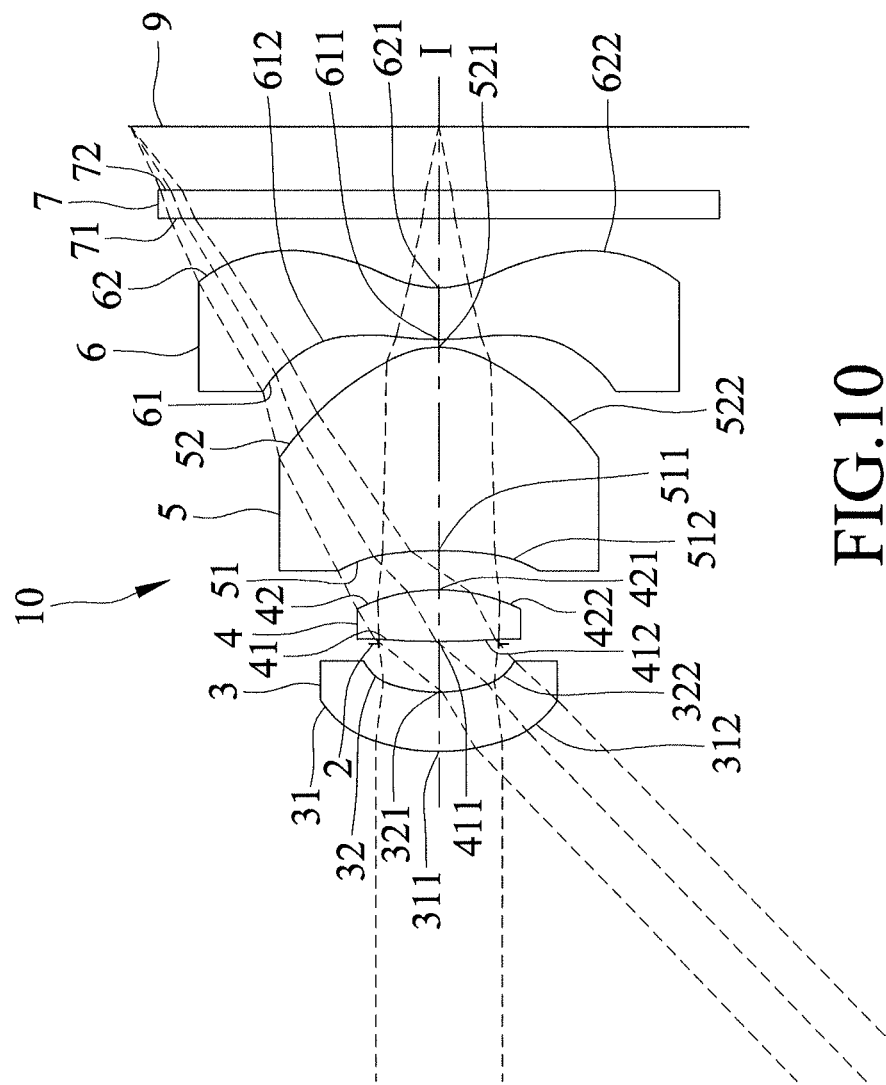
FIG. 10 is a schematic diagram that illustrates the third preferred embodiment of an imaging lens according to the present invention.
Figures 13A, 13B, 13C, 13D:
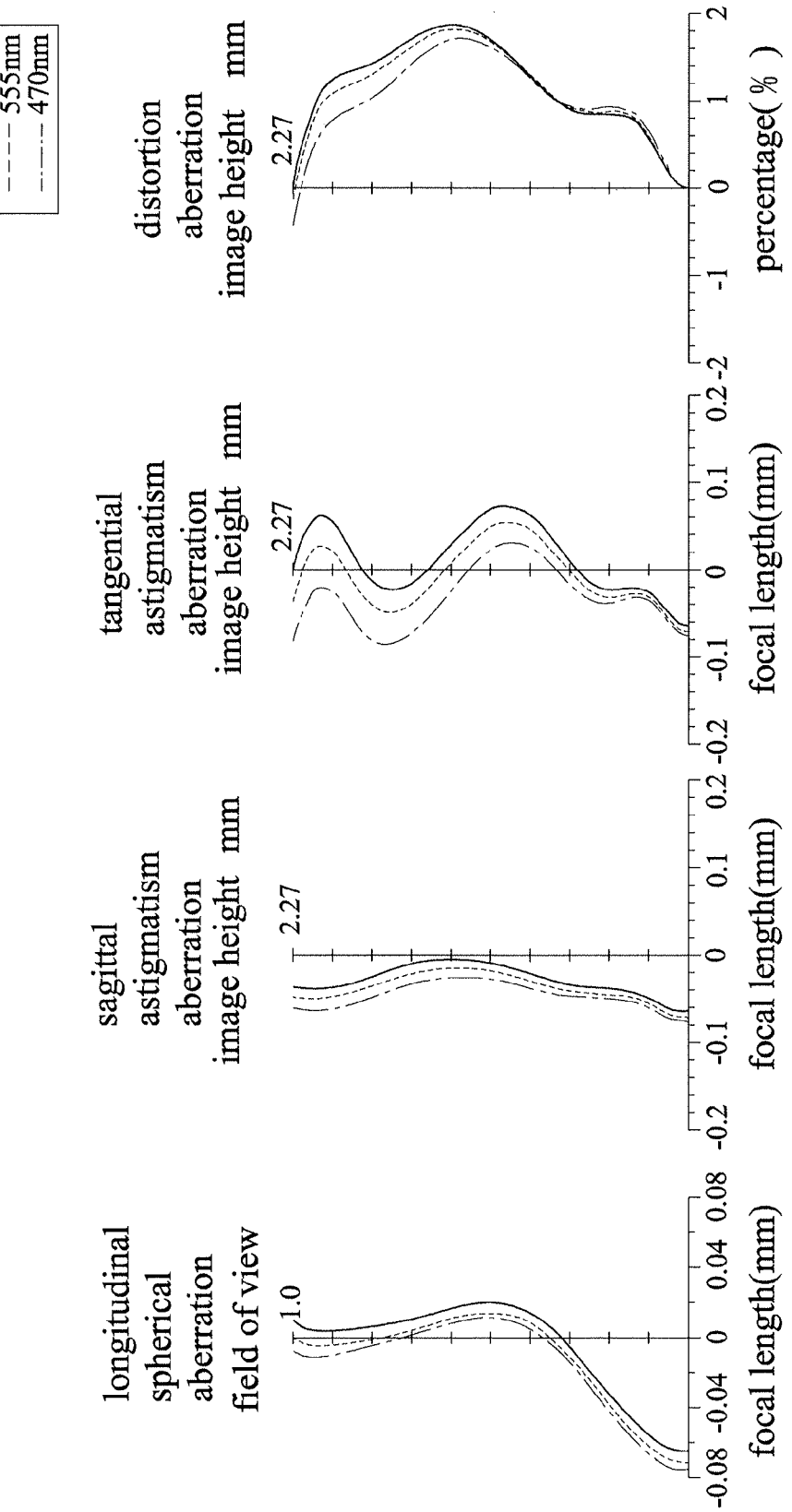
FIGS. 13(a) to 13(d) show different optical characteristics of the imaging lens of the third preferred embodiment.

FIG. 10 illustrates a third preferred embodiment of an imaging lens 10 according to the present invention, which has a configuration similar to that of the first preferred embodiment. The differences between the first and third preferred embodiments of the imaging lens 10 of this invention reside in modifications of some optical data, aspherical coefficients and the lens parameters of the lens elements 3-6.

Shown in FIG. 11 is a table that lists values of some optical data corresponding to the surfaces 31-71, 32-72 of the third preferred embodiment. The imaging lens 10 has an overall system focal length of 2.256 mm, an HFOV of 44.39°, an F-number of 2.4, and a system length of 4.601 mm.

Shown in FIG. 12 is a table that lists values of some aspherical coefficients of the aforementioned relationship (1) corresponding to the third preferred embodiment.

Relationships among some of the aforementioned lens parameters corresponding to the third preferred embodiment are as follows:
ALT=2.693; Gaa=0.721; BFL=1.187;
T3/G12=4.050; ALT/BFL=2.269;
T4/G12=1.034; T3/G23=5.182;
ALT/G12=7.252; BFL/T1=2.789;
BFL/Gaa=1.645; T3/T1=3.544;
BFL/G23=4.090; T3/T2=3.947;
T3/Gaa=2.084; BFL/G12=3.197;
and ALT/Gaa=3.733.

FIGS. 13(a) to 13(d) respectively show simulation results corresponding to longitudinal spherical aberration, sagittal astigmatism aberration, tangential astigmatism aberration, and distortion aberration of the third preferred embodiment. It can be understood from FIGS. 13(a) to 13(d) that the third preferred embodiment is able to achieve a relatively good optical performance.

Figure 14:
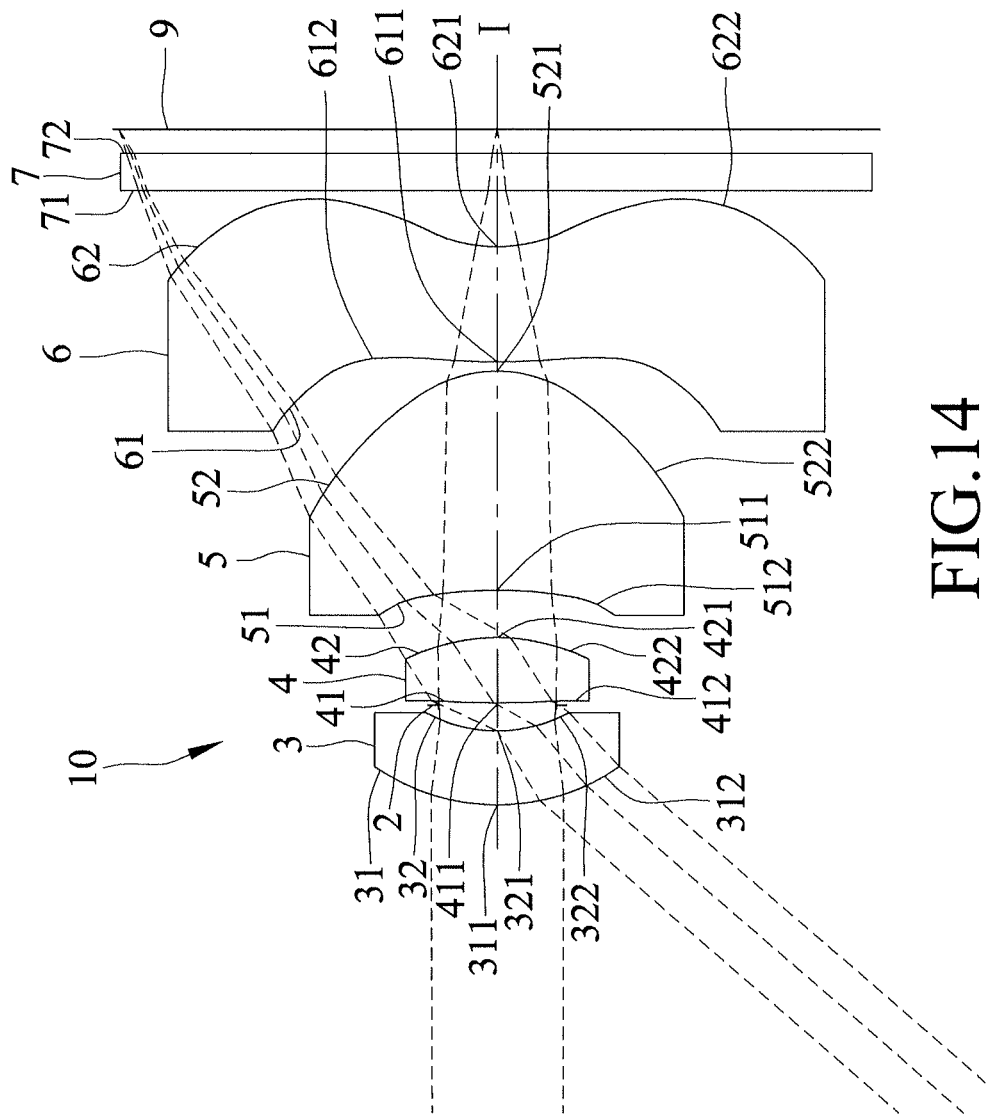
FIG. 14 is a schematic diagram that illustrates the fourth preferred embodiment of an imaging lens according to the present invention.
Figure 17:
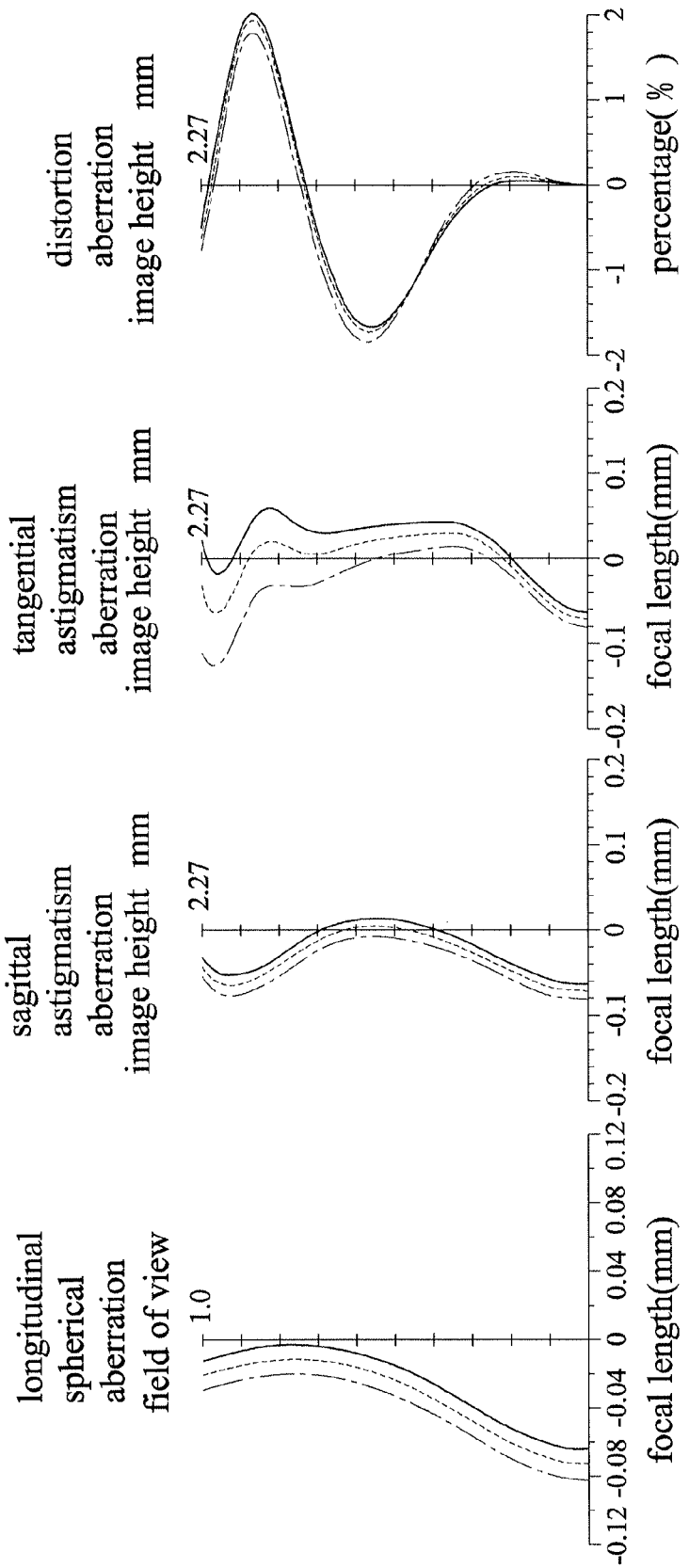
FIGS. 17(a) to 17(d) show different optical characteristics of the imaging lens of the fourth preferred embodiment.

Referring to FIG. 14, a fourth preferred embodiment of the imaging lens 10 of this invention is shown. The differences between the first and fourth preferred embodiments reside in modifications of some optical data, aspherical coefficients and lens parameters of the lens elements 3-6.

Shown in FIG. 15 is a table that lists values of some optical data corresponding to the surfaces 31-71, 32-72 of the fourth preferred embodiment. The imaging lens 10 has an overall system focal length of 1.878 mm, an HFOV of 49.44°, an F-number of 2.4, and a system length of 4.066 mm.

Shown in FIG. 16 is a table that lists values of some aspherical coefficients of the aforementioned relationship (1) corresponding to the fourth preferred embodiment.

Relationships among some of the aforementioned lens parameters corresponding to the fourth preferred embodiment are as follows:
ALT=2.850; Gaa=0.510; BFL=0.707;
T3/G12=7.806; ALT/BFL=4.032;
T4/G12=4.136; T3/G23=4.546;
ALT/G12=16.843; BFL/T1=1.578;
BFL/Gaa=1.387; T3/T1=2.949;
BFL/G23=2.433; T3/T2=3.465;
T3/Gaa=2.591; BFL/G12=4.177;
and ALT/Gaa=5.591.

FIGS. 17(a) to 17(d) respectively show simulation results corresponding to longitudinal spherical aberration, sagittal astigmatism aberration, tangential astigmatism aberration, and distortion aberration of the fourth preferred embodiment. It can be understood from FIGS. 17(a) to 17(d) that the fourth preferred embodiment is able to achieve a relatively good optical performance.

Figure 18:
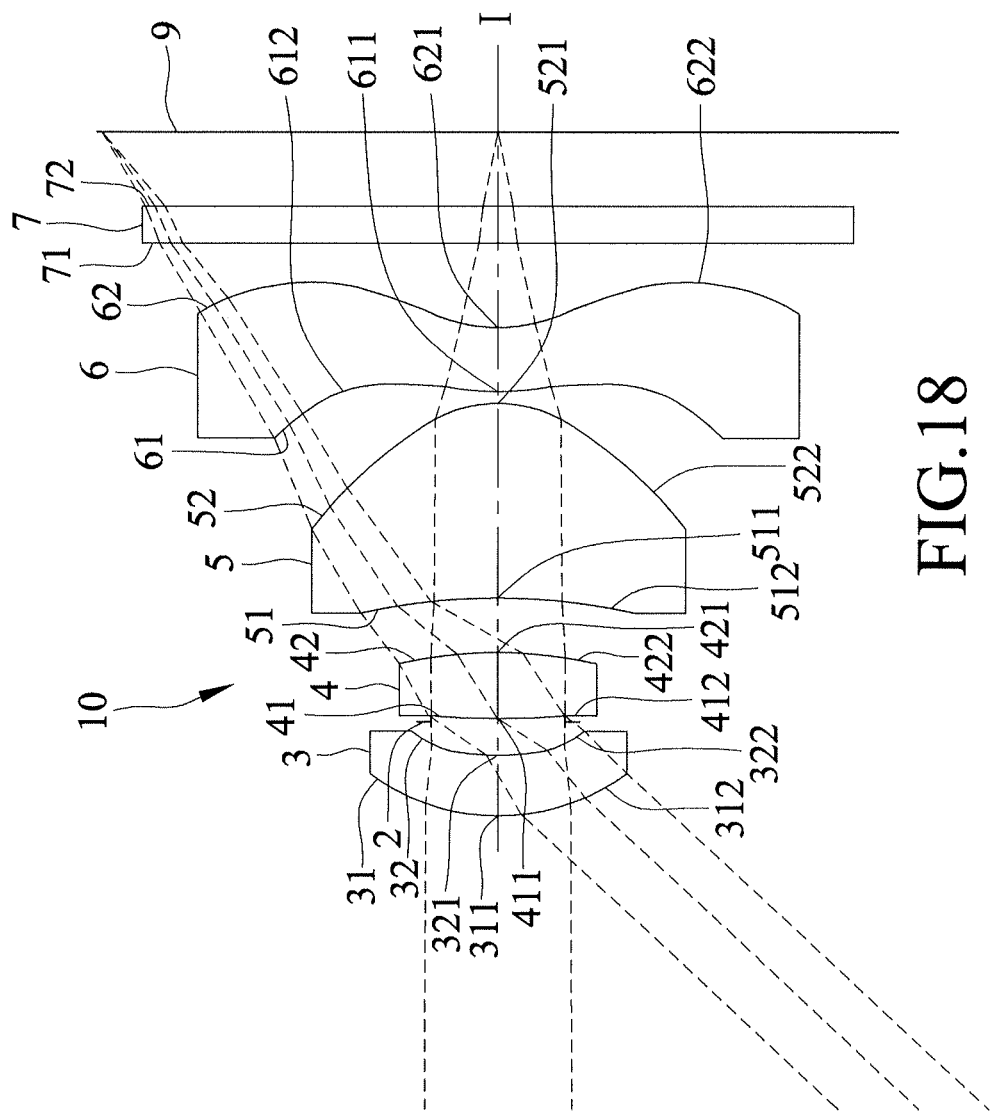
FIG. 18 is a schematic diagram that illustrates the fifth preferred embodiment of an imaging lens according to the present invention.
Figure 21:
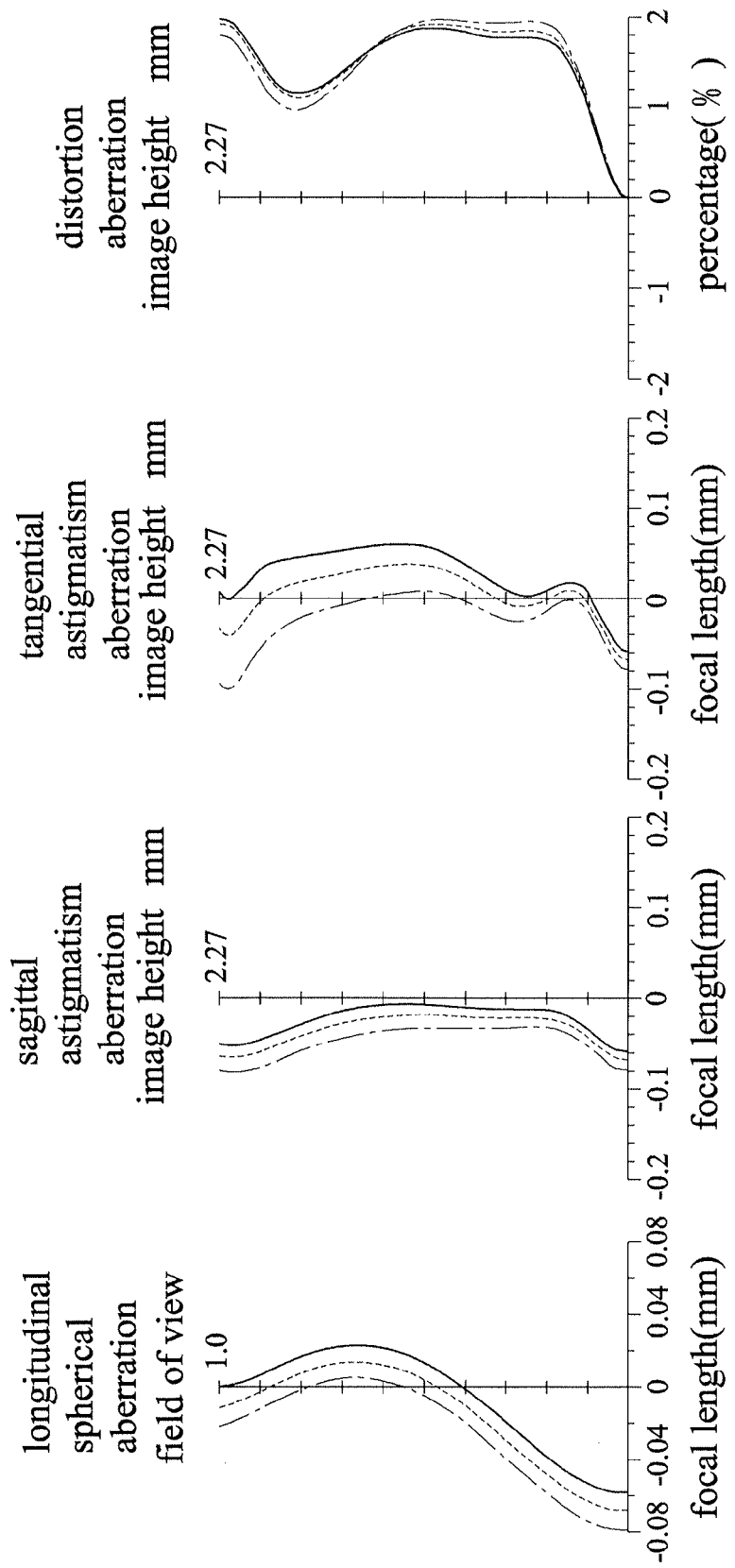
FIGS. 21(a) to 21(d) show different optical characteristics of the imaging lens of the fifth preferred embodiment.

Referring to FIG. 18, a fifth preferred embodiment of the imaging lens 10 of this invention is shown. The differences between the first and fifth preferred embodiments of the imaging lens 10 reside in modifications of some optical data, aspherical coefficients and lens parameters of the lens elements 3-6.

Shown in FIG. 19 is a table that lists values of some optical data corresponding to the surfaces 31-71, 32-72 of the fifth preferred embodiment. The imaging lens 10 has an overall system focal length of 1.989 mm, an HFOV of 47.41°, an F-number of 2.4, and a system length of 3.930 mm.

Shown in FIG. 20 is a table that lists values of some aspherical coefficients of the aforementioned relationship (1) corresponding to the fifth preferred embodiment.

Relationships among some of the aforementioned lens parameters corresponding to the fifth preferred embodiment are as follows:
ALT=2.193; Gaa=0.599; BFL=1.138;
T3/G12=5.214; ALT/BFL=1.928;
T4/G12=1.644; T3/G23=3.543;
ALT/G12=10.141; BFL/T1=3.242;
BFL/Gaa=1.899; T3/T1=3.214;
BFL/G23=3.574; T3/T2=3.139;
T3/Gaa=1.882; BFL/G12=5.260;
and ALT/Gaa=3.661.

FIGS. 21(a) to 21(d) respectively show simulation results corresponding to longitudinal spherical aberration, sagittal astigmatism aberration, tangential astigmatism aberration, and distortion aberration of the fifth preferred embodiment. It can be understood from FIGS. 21(a) 21(d) that the fifth preferred embodiment is able to achieve a relatively good optical performance.

Figure 22:
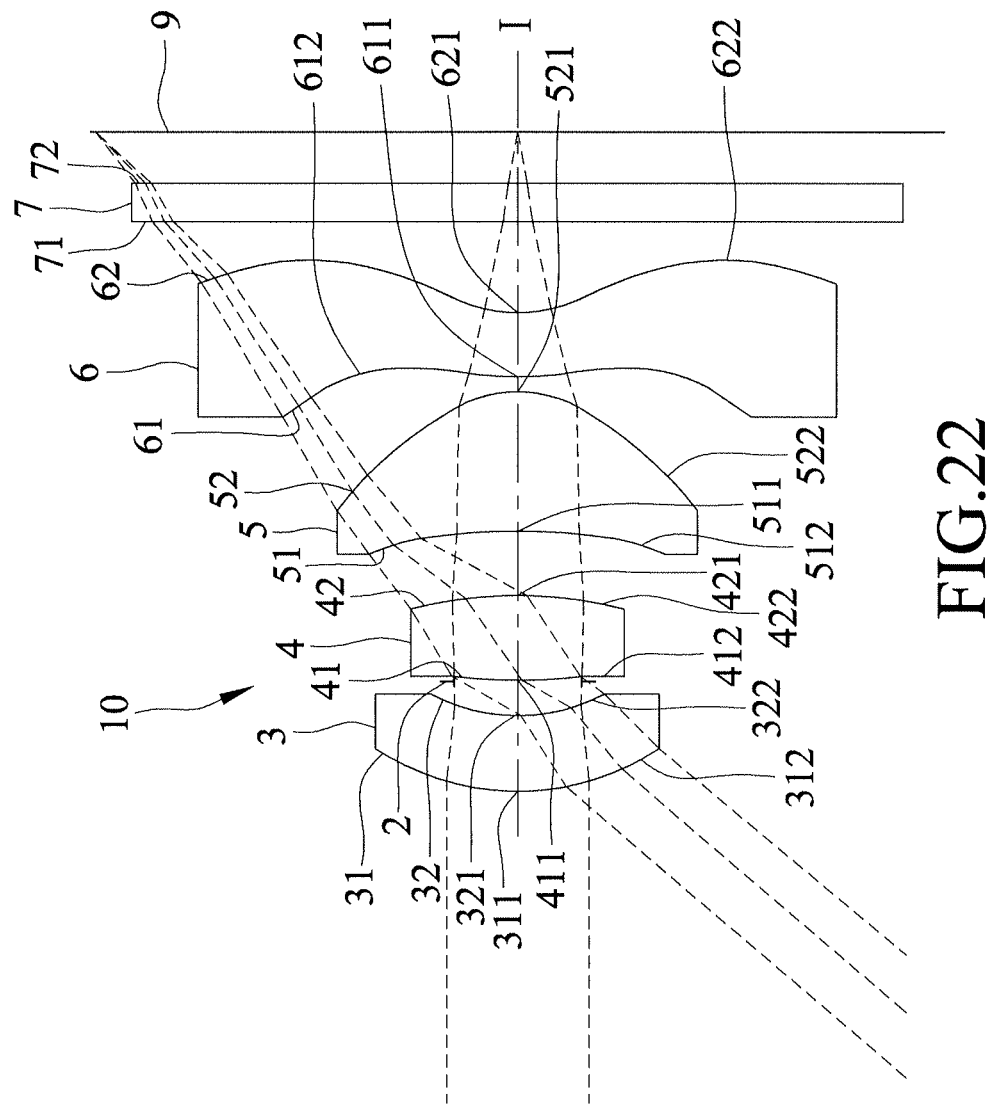
FIG. 22 is a schematic diagram that illustrates the sixth preferred embodiment of an imaging lens according to the present invention.
Figures 25A, 25B, 25C, 25D:
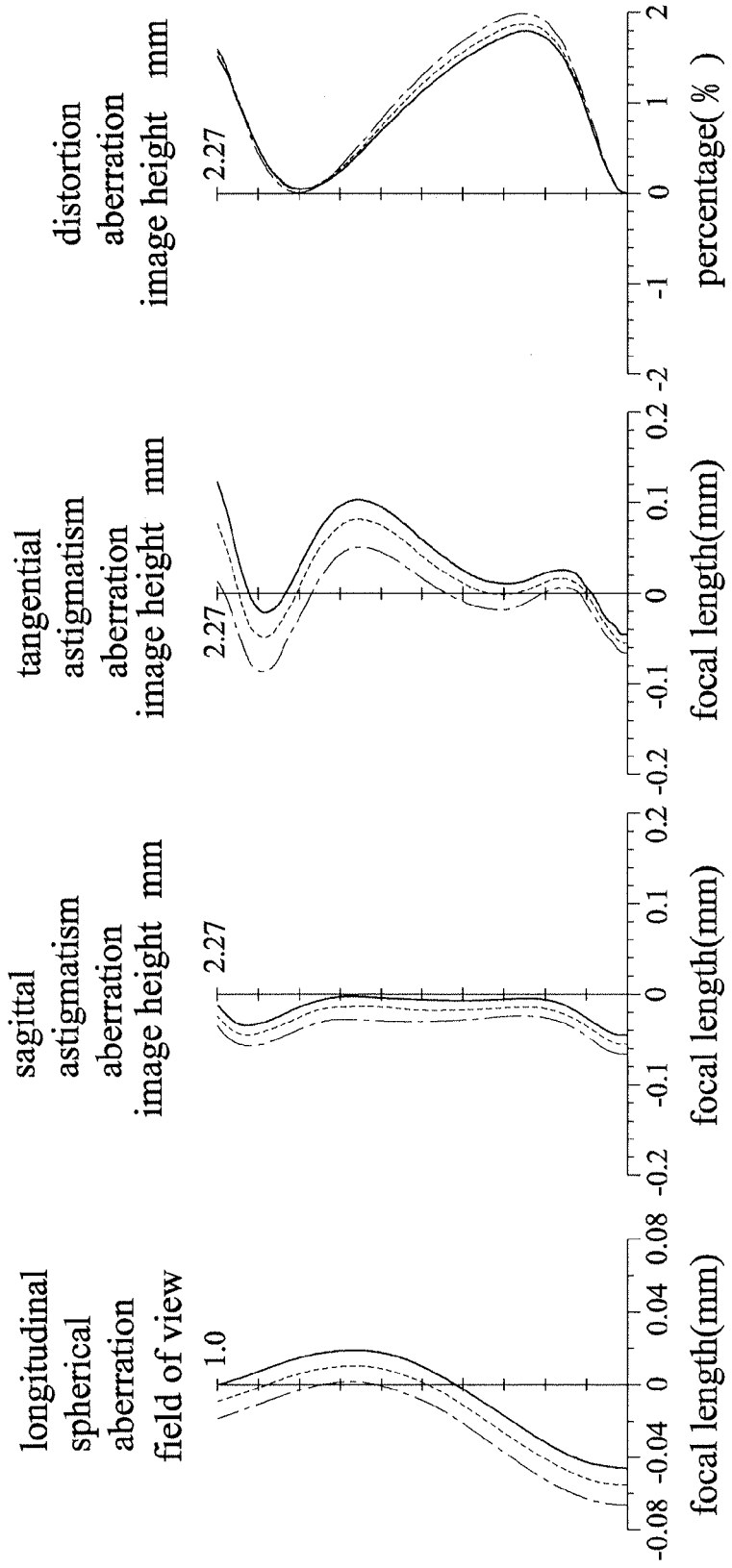
FIGS. 25(a) to 25(d) show different optical characteristics of the imaging lens of the sixth preferred embodiment.

FIG. 22 illustrates the sixth preferred embodiment of an imaging lens 10 according to the present invention, which has a configuration similar to that of the first preferred embodiment. The differences between the first and sixth preferred embodiments of the imaging lens 10 of this invention reside in modifications of some optical data, aspherical coefficients and lens parameters of the lens elements 3-6.

Shown in FIG. 23 is a table that lists values of some optical data corresponding to the surfaces 31-71, 32-72 of the sixth preferred embodiment. The imaging lens 10 has an overall system focal length of 1.850 mm, an HFOV of 49.58°, an F-number of 2.4, and a system length of 3.571 mm.

Shown in FIG. 24 is a table that lists values of some aspherical coefficients of the aforementioned relationship (1) corresponding to the sixth preferred embodiment.

Relationships among some of the aforementioned lens parameters corresponding to the sixth preferred embodiment are as follows:
ALT=1.963; Gaa=0.620; BFL=0.987;
T3/G12=3.915; ALT/BFL=1.988;
T4/G12=1.764; T3/G23=2.218;
ALT/G12=10.112; BFL/T1=2.377;

BFL/Gaa=1.591; T3/T1=1.830;
BFL/G23=2.882; T3/T2=1.707;
T3/Gaa=1.225; BFL/G12=5.085;
and ALT/Gaa=3.164

FIGS. 25(a) to 25(d) respectively show simulation results corresponding to longitudinal spherical aberration, sagittal astigmatism aberration, tangential astigmatism aberration, and distortion aberration of the sixth preferred embodiment. It can be understood from FIGS. 25(a) to 25(d) that the sixth preferred embodiment is able to achieve a relatively good optical performance.

Shown in FIG. 26 is a table that lists the aforesaid relationships among some of the aforementioned lens parameters corresponding to the six preferred embodiments for comparison. When each of the lens parameters of the imaging lens 10 according to this invention satisfies the following relationships, the optical performance is still relatively good even with the reduced system length:

(1) T3/G12≥2.8: Although reductions of both T3 and G12 may facilitate developing a thinner imaging lens 10, reduction of T3 is limited due to manufacturing techniques, so that T3 should have a suitable value. On the other hand, G12 does not have such limitations, and design thereof tends to be small. Better arrangement may be achieved when this relationship is satisfied. Preferably, 2.8≤T3/G12≤9.0

(2) T3/G12≥2.0, ALT/G12≥5.0, T3/Gaa≥1.05, and ALT/Gaa≥3.0: ALT is limited due to manufacturing techniques like T3, and both G12 and Gaa should be designed to have relatively large reducible ratios due to the same reason as G12. Thus, T3/G23, ALT/G12, T3/Gaa and ALT/Gaa tend to be large. Better arrangement may be achieved when these relationships are satisfied. Preferably, 2.0≤T3/G23≤6.0, 5.0≤ALT/G12≤18.0, 1.05≤T3/Gaa≤3.0, and 3.0≤ALT/Gaa≤7.0.

(3) BFL/G23≥2.4, BFL/G12≥4.0, and BFL/Gaa≥1.2: Adjustment of BFL is limited due to specifications of peripheral elements of the imaging lens 10, while G12, G23 and Gaa may be reduced properly for reduction of the system length of the imaging lens 10. Therefore, designs of BFL/G12, BFL/G23 and BFL/Gaa tend to be large. Better arrangement may be achieved when these relationships are satisfied. Preferably, 2.4≤BFL/G23≤5.0, 4.0≤BFL/G12≤8.0, and 1.2≤BFL/Gaa≤3.0.

(4) ALT/BFL≥1.3, BFL/T1≥1.0 (for instance, 1.0≤BFL/T1≤4.0), T3/T1≥1.5, and T3/T2≥2.4: Ratios among ALT, BFL, T1, T2 and T3 should be proper to avoid any one of these parameters being too large, resulting in a long system length of the imaging lens 10, and/or to avoid any one of these parameters being too small, resulting in difficulty in manufacturing the imaging lens 10. Better arrangement may be achieved when these relationships are satisfied. Preferably, 1.3≤ALT/BFL≤5.0, 2.5≤BFL/T1≤4.0, 1.5≤T3/T1≤4.0, and 2.4≤T3/T2≤4.5.

(5) T4/G12≤5.0: Maintaining a proper ratio between T4 and G12 may enhance optical performance of the imaging lens 10.

To sum up, effects and advantages of the imaging lens 10 according to the present invention are described hereinafter.

Longitudinal spherical aberration, astigmatism aberration, and distortion aberration of the first to sixth preferred embodiments do not exceed the range of ±0.05 mm, the range of ±0.1 mm, and the range of ±2%, respectively. The off-axis rays corresponding respectively to wavelengths of 470 nm (blue ray), 555 nm (green ray), and 650 nm (red ray) are around the imaging point. It is evident from the deviation range of each of the curves that deviations of the imaging points of the off-axis rays with different height are well controlled so that the imaging lens 10 has good performance in terms of in spherical aberration, astigmatism aberration and distortion aberration at each of the wavelengths. Furthermore, since the curves with different wavelengths that respectively represent red, green, and blue rays are close to each other, the imaging lens 10 has a relatively low chromatic aberration. As a result, by virtue of the abovementioned design of the lens elements, good image quality may be achieved.

In addition, through the aforesaid six preferred embodiments, it is known that the system length of this invention may be reduced down to below 5.1 mm while maintaining good optical performance.

Figure 27:
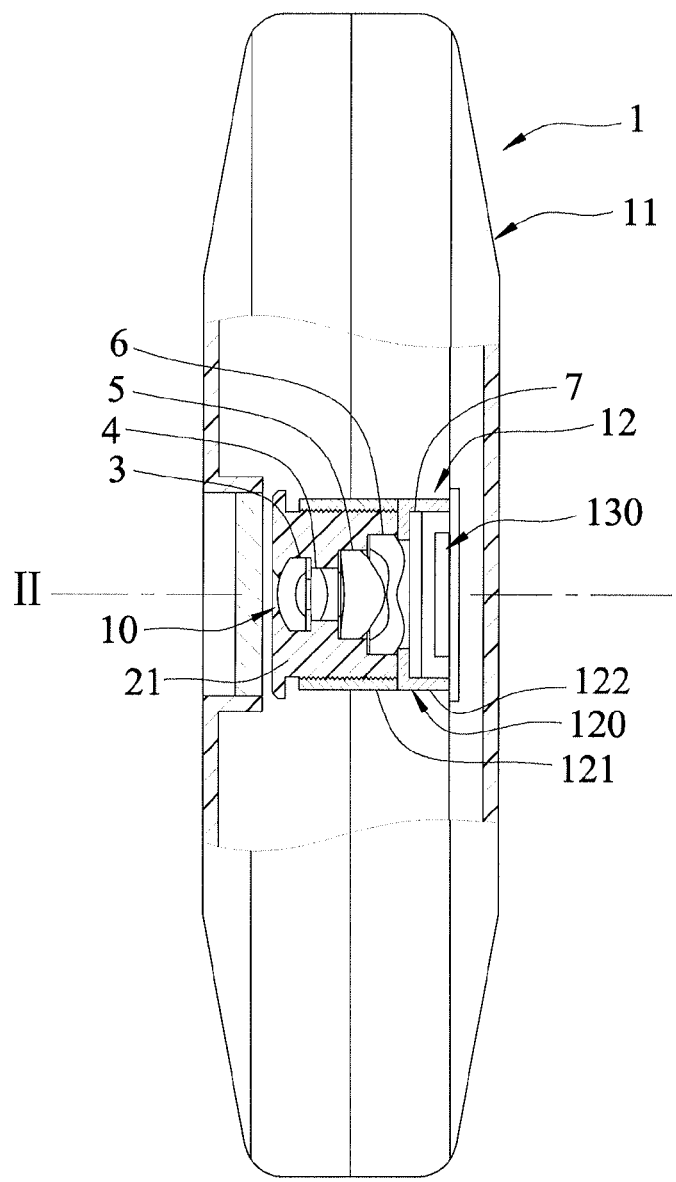
FIG. 27 is a schematic partly sectional view to illustrate a first exemplary application of the imaging lens of the present invention.

Shown in FIG. 27 is a first exemplary application of the imaging lens 10, in which the imaging lens 10 is disposed in a housing 11 of an electronic apparatus 1 (such as a mobile phone, but not limited thereto), and forms a part of an imaging module 12 of the electronic apparatus 1. The imaging module 12 includes a barrel 21 on which the imaging lens 10 is disposed, a holder unit 120 on which the barrel 21 is disposed, and an image sensor 130 disposed at the image plane 9 (see FIG. 2).

The holder unit 120 includes a first holder portion 121 in which the barrel 21 is disposed, and a second holder portion 122 having a portion interposed between the first holder portion 121 and the image sensor 130. The barrel 21 and the first holder portion 121 of the holder unit 120 extend along an axis (II), which coincides with the optical axis (I) of the imaging lens 10.

Figure 28:
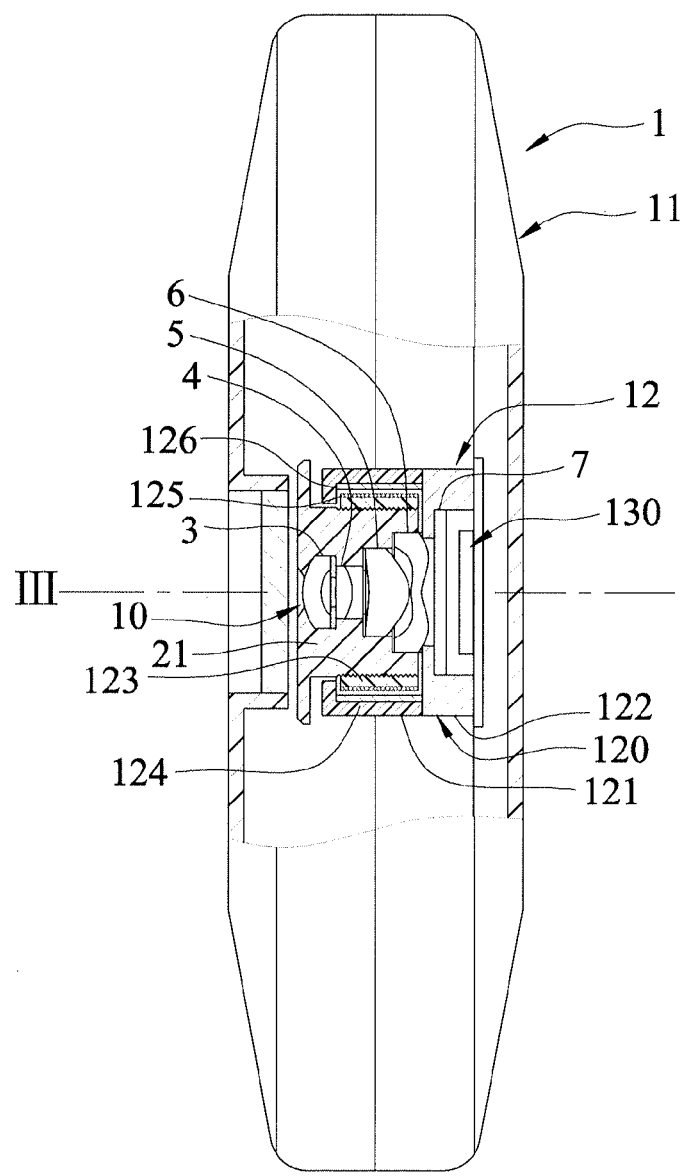
FIG. 28 is a schematic partly sectional view to illustrate a second exemplary application of the imaging lens of the present invention.

Shown in FIG. 28 is a second exemplary application of the imaging lens 10. The differences between the first and second exemplary applications reside in that, in the second exemplary application, the holder unit 120 is configured as a voice-coil motor (VCM), and the first holder portion 121 includes an inner section 123 in which the barrel 21 is disposed, an outer section 124 that surrounds the inner section 123, a coil 125 that is interposed between the inner and outer sections 123, 124, and a magnetic component 126 that is disposed between an outer side of the coil 125 and an inner side of the outer section 124.

The inner section 123 and the barrel 21, together with the imaging lens 10 therein, are movable with respect to the image sensor 130 along an axis (III), which coincides with the optical axis (I) of the imaging lens 10. The optical filter 7 of the imaging lens 10 is disposed at the second holder portion 122, which is disposed to abut against the outer section 124. Configuration and arrangement of other components of the electronic apparatus 1 in the second exemplary application are identical to those in the first exemplary application, and hence will not be described hereinafter for the sake of brevity.

By virtue of the imaging lens 10 of the present invention, the electronic apparatus 1 in each of the exemplary applications may be configured to have a relatively reduced overall thickness with good optical and imaging performance, so as to reduce cost of materials, and satisfy requirements of product miniaturization.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An imaging lens comprising a first lens element, an aperture stop, a second lens element, a third lens element and a fourth lens element arranged in order from an object side to an image side along an optical axis of said imaging lens, each of said first lens element, said second lens element, said third lens element and said fourth lens element having an object-side surface facing toward the object side, and an image-side surface facing toward the image side, wherein:

said first lens element has a negative refractive power;
said object-side surface of said first lens element has a convex portion in a vicinity of the optical axis;
said second lens element has a positive refractive power;
said third lens element has a positive refractive power;
said object-side surface of said third lens element has a concave portion in a vicinity of the optical axis;
said fourth lens element has a negative refractive power;
said image-side surface of said fourth lens element has a concave portion in a vicinity of the optical axis, and a convex portion in a vicinity of a periphery of said fourth lens element;
said imaging lens satisfies $6.0 \geq T3/G23 \geq 2.0$, where T3 represents a thickness of said third lens element at the optical axis, and G23 represents an air gap length between said second lens element and said third lens element at the optical axis; and
said imaging lens does not include any lens element with refractive power other than said first lens element, said second lens element, said third lens element and said fourth lens element.

2. The imaging lens as claimed in claim 1, satisfying $18.0 \geq ALT/G12 \geq 5.0$, where ALT represents a sum of thicknesses of said first lens element, said second lens element, said third lens element and said fourth lens element at the optical axis, and G12 represents an air gap length between said first lens element and said second lens element at the optical axis.

3. The imaging lens as claimed in claim 2, further satisfying $3.0 \geq T3/Gaa \geq 1.05$, where Gaa represents a sum of air gap widths among said first lens element, said second lens element, said third lens element, and said fourth lens element at the optical axis.

4. The imaging lens as claimed in claim 3, wherein said object-side surface of said third lens element has a concave portion in a vicinity of a periphery of said third lens element.

5. The imaging lens as claimed in claim 1, satisfying $4.0 \geq BFL/T1 \geq 1.0$, where BFL represents a back focal length of said imaging lens, and T1 represents a thickness of said first lens element at the optical axis.

6. The imaging lens as claimed in claim 1, satisfying $3.0 \geq BFL/Gaa \geq 1.2$, where BFL represents a back focal length of said imaging lens, and Gaa represents a sum of air gap widths among said first lens element, said second lens element, said third lens element, and said fourth lens element at the optical axis.

7. The imaging lens as claimed in claim 6, further satisfying $8.0 \geq BFL/G12 \geq 4.0$ and $7.0 \geq ALT/Gaa \geq 3.0$, where ALT represents a sum of thicknesses of said first lens element, said second lens element, said third lens element and said fourth lens elements at the optical axis, and G12 represents an air gap length between said first lens element and said second lens element at the optical axis.

8. The imaging lens as claimed in claim 1, satisfying $9.0 \geq T3/G12 \geq 2.8$, where G12 represents an air gap length between said first lens element and said second lens element at the optical axis.

9. The imaging lens as claimed in claim 1, satisfying $5.0 \geq ALT/BFL \geq 1.3$, where ALT represents a sum of thicknesses of said first lens element, said second lens element, said third lens element and said fourth lens element at the optical axis, and BFL represents a back focal length of said imaging lens.

10. The imaging lens as claimed in claim 1, satisfying $4.0 \geq T3/T1 \geq 1.5$, where T1 represents the thickness of said first lens element at the optical axis.

11. The imaging lens as claimed in claim 1, satisfying $T4/G12 \leq 5$, where T4 represents a thickness of said fourth lens element at the optical axis, and G12 represents an air gap length between said first lens element and said second lens element at the optical axis.

12. The imaging lens as claimed in claim 1, satisfying $5.0 \geq BFL/G23 \geq 2.4$, where BFL represents a back focal length of said imaging lens.

13. The imaging lens as claimed in claim 1, satisfying $4.5 \geq T3/T2 \geq 2.4$, where T2 represents a thickness of said second lens element at the optical axis.

14. The imaging lens as claimed in claim 1, satisfying $4.0 \geq BFL/T1 \geq 2.5$, where BFL represents a back focal length of said imaging lens, and T1 represents a thickness of said first lens element at the optical axis.

* * * * *